United States Patent [19]

Weltmann

[11] Patent Number: 5,488,439

[45] Date of Patent: Jan. 30, 1996

[54] LENS HOLDER SYSTEM FOR EYEGLASS FRAME SELECTION

[76] Inventor: Alfred Weltmann, 1135 Thompson, Buffalo Grove, Ill. 60089

[21] Appl. No.: 490,337

[22] Filed: Jun. 14, 1995

[51] Int. Cl.⁶ ..................................................... G02C 7/08
[52] U.S. Cl. ............................. 351/58; 351/41; 351/230; 351/231
[58] Field of Search ................................ 351/58, 41, 158, 351/227, 230, 231, 178

[56] References Cited

U.S. PATENT DOCUMENTS

| | | | |
|---|---|---|---|
| 4,029,402 | 6/1977 | Noble | 351/58 |
| 4,269,487 | 5/1981 | Young | 351/58 |

*Primary Examiner*—William L. Sikes
*Assistant Examiner*—Hung Xuan Dang
*Attorney, Agent, or Firm*—Drucker & Sommers

[57] ABSTRACT

A lens holder system for temporarily holding a prescription lens in the openings eyeglass frames having perimeter grooves so that the patient can see what a pair of eyeglass frames will look like on him or her. The system has a plurality of pairs of lens holders. Each lens holder includes a prescription lens, a prescription lens encircling portion, a pair of resilient spring wires fixed at first ends to opposite sides of the prescription lens encircling portion, and a pair of guides positioned on the lens encircling portion distant from the point of attachment of the first ends of the spring wires to the lens encircling portion. The second ends of the spring wires are slidably engaged with one of the guides and the second ends of the spring wires have terminal stops to prevent the spring wires from being withdrawn from the guides. The pair of spring wires form a pair of spring wire loops which extend outwardly from opposite sides of the lens encircling portion, and which can be contracted and expanded as desired to fit into the perimeter grooves of the eyeglasses to temporarily retain the prescription lenses in the eyeglass frame during a eyeglass frame selection process. The prescription lenses range in power from +1.00 Diopters to +8.00 Diopters and from −1.00 Diopters to −12.00 Diopters, preferably in one Diopter increments.

16 Claims, 2 Drawing Sheets

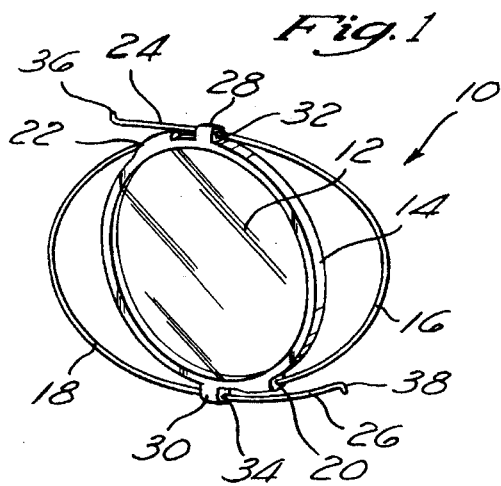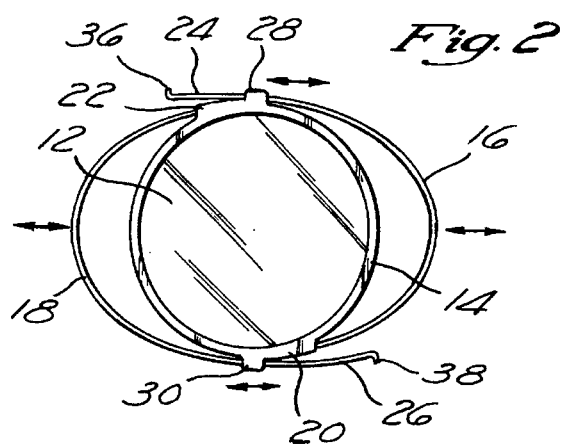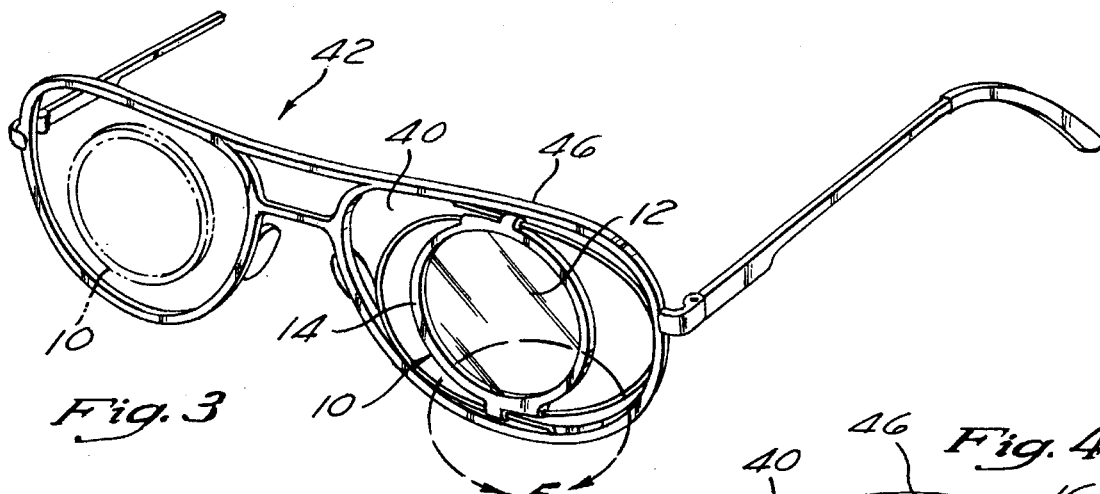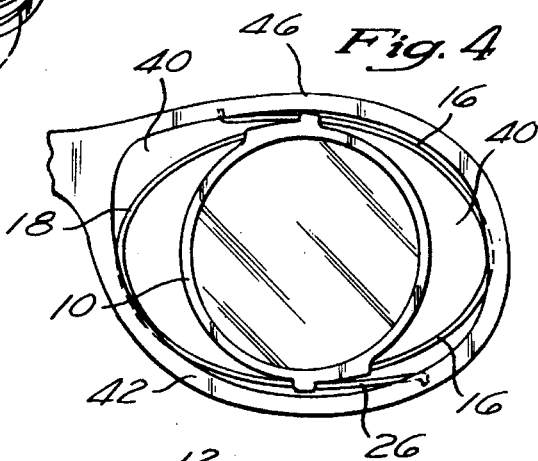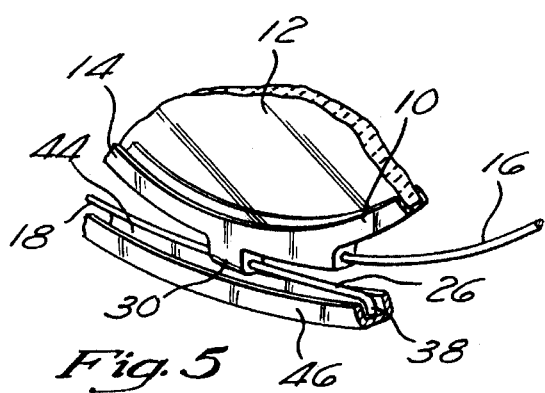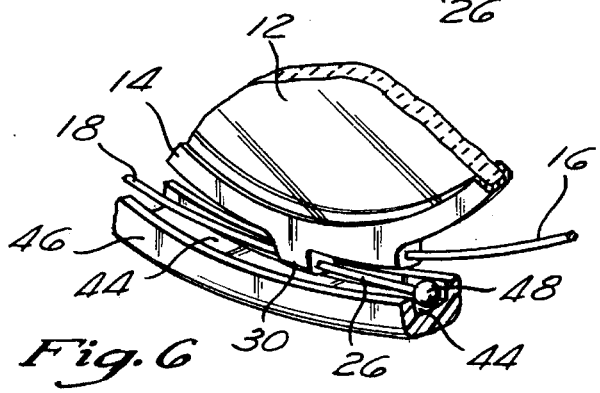

5,488,439

LENS HOLDER SYSTEM FOR EYEGLASS FRAME SELECTION

BACKGROUND OF THE INVENTION

1. Field of the Invention

The invention relates to the field of eyeglasses, and more particularly to an eyeglass lens holding system which quickly allows a patient being fitted with eyeglasses to clearly see what the eyeglasses frames will look like on his or her face before it is fitted with the permanent lens.

2. Description of the Prior Art

There have been numerous attempts to devise an eyeglass lens holding system which quickly and easily allows an optician to temporarily fit a pair of prescription lenses into a pair of eyeglass frames a patient wishes to try out. U.S. Pat. No. 1,884,371 to Swart discloses lens holders for eyeglass frames. An inner split lens-engaging rim is used to hold the lens and an outer split rim-engaging ring is used to hold the lens in the opening of eyeglasses. Fingers extend from the ends of the outer split-rim portions, which can be grasped to allow the lens holder to be placed in the eyeglasses' lens openings. One problem with the Swart device is that it would not be expected to be very adaptable to frames of different sizes and shapes due to their use of a single expanding ring. For example, while the Swart device might be acceptable for eyeglasses with perfectly circular lens openings, it would not be expected to function well for eyeglass frames having undersized or oversized lens openings, or openings which are non-circular. Another problem with the Swart device is that its design would render the centering of the lens in the eyeglass frames's openings more difficult due to its predetermined set off of the inner split-ring from the outer split-ring.

U.S. Pat. No. 4,029,402 to Noble discloses a lens holding device for selecting eyeglass frames. It has a frame which retains the lens, from which several resilient legs extend. The resilient legs have terminal feet which fit into the grooves of the eyeglass frames and hold the lens in the lens openings. While the Noble device would likely fit a wide variety of lenses, its design with several legs and feet tends to create a "filled up" and "busy" look in the eyeglass lens opening, which might make it more difficult for some individuals to select desired eyeglass frames, due to the distraction caused.

U.S. Pat. No. 2,872,843 to Kono discloses a test lens for eyeglass frame. In the Kono device, an undersized eyeglass lens is fit into a transparent lens holder, which has tapered edges designed to fit into grooves around the inner perimeter of the eyeglass frames. A spring is placed on one side of the lens holder and is used to complete the fit of the lens holder into the eyeglass frames. The Kono design, with its use of a single clip, would not be expected to fit all styles and sizes of frames, and would not be adaptable to position the lens in the eyeglass frame in the exact position desired.

There accordingly remains a need for an eyeglass lens holder which is easy and fast to use, relatively unobtrusive, and which does not excessively detract from the appearance of the eyeglass frame during selection, which can be fit into a wide variety of eyeglass frames, and which can be used to position the eyeglass lens as desired in the eyeglass frames.

BRIEF DESCRIPTION OF THE INVENTION

The invention provides a lens holder system for temporarily holding a prescription lens in the opening of eyeglass frames having perimeter grooves, comprising lens holders, each having:

a prescription lens;

a prescription lens encircling portion;

a pair of resilient, spring wire means with first and second end regions, said spring wires being fixably attached by said first end regions to opposing sides of said prescription lens encircling portion; and a pair of guide means positioned on said lens encircling portion distant from the points of attachment of said first end regions of said spring wire means to said lens encircling portion;

wherein each of said second end regions of said spring wires are slidably engaged with one of said guide means and said second end regions of said spring wires have terminal stop means to prevent said second end regions from being withdrawn from said guide means, said pair of spring wire means forming a pair of spring wire loops which extend from opposite sides of the lens encircling portion, and which tend to expand outwardly, and which can be contracted and expanded as desired to temporarily retain the prescription lens in the eyeglass frame during a eyeglass frame selection process.

The invention further provides a lens holder system for temporarily holding prescription lenses in the openings eyeglass frames having perimeter grooves, comprising a plurality of pairs of lens holders, each plurality of pairs of lens holders having:

a prescription lens;

a prescription lens encircling portion;

a pair of resilient, spring wire means with first and second end regions, said spring wires being fixably attached by said first end regions to opposing sides of said prescription lens encircling portion; and a pair of guide means positioned on said lens encircling portion distant from the points of attachment of said first end regions of said spring wire means to said lens encircling portion;

wherein each of said second end regions of said spring wires are slidably engaged with one of said guide means and said second end regions of said spring wires have terminal stop means to prevent said second end regions from being withdrawn from said guide means, said pair of spring wire means forming a pair of spring wire loops which extend from opposite sides of the lens encircling portion, and which tend to expand outwardly, and which can be contracted and expanded as desired to temporarily retain the prescription lens in the eyeglass frame during a eyeglass frame selection process.

DESCRIPTION OF THE DRAWINGS

The invention is described in greater detail with reference to the drawings, as follows:

FIG. 1 is a perspective view of a first embodiment of the eyeglass lens holder for eyeglass frame selection of the invention.

FIG. 2 is a front view of the eyeglass lens holder of FIG. 1.

FIG. 3 is a perspective view of the eyeglass lens holder of FIG. 1 placed in an eyeglass frame.

FIG. 4 is a partial front view of the eyeglass lens holder placed in the eyeglass frame of FIG. 3.

FIG. 5 is a partially exposed detail of the circled area 5 of FIG. 3 showing how the eyeglass lens holder is detachably positioned in the eyeglass frame.

FIG. 6 is a partially exposed detail of the circled area 5 of FIG. 3 showing how a slightly modified embodiment of the eyeglass lens holder is detachably positioned in the eyeglass frame.

DETAILED DESCRIPTION OF THE INVENTION

Figure 7:
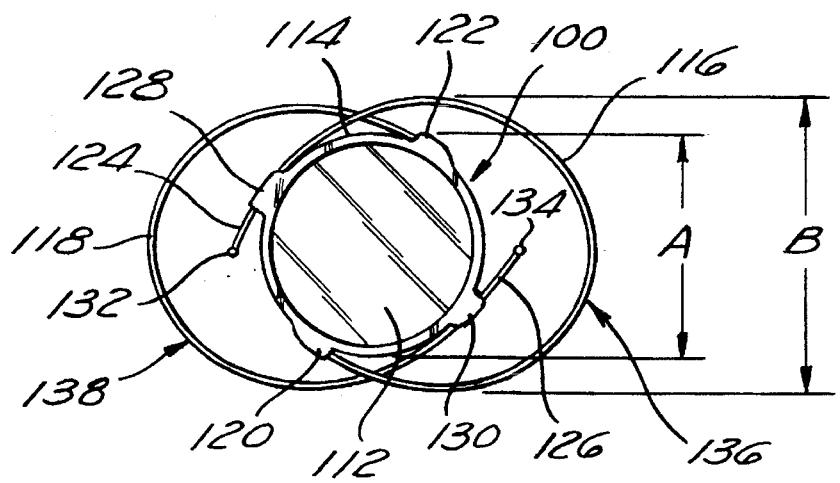
FIG. 7 is a perspective view of a second embodiment of the eyeglass lens holder for eyeglass frame selection.

Referring to FIGS. 1 and 2, a first embodiment of the eyeglass lens holder 10 for selection of eyeglass frames of the invention is shown. It has a prescription lens 12 which is retained in a lens encircling portion 14. This lens encircling portion 14 can conveniently comprise a U-shaped metal band clamped closed around the lens 12. The lens holder 10 further has a pair of spring wires 16 and 18. The spring wires 16 and 18 are attached at first ends 20 and 22 to opposite sides of the lens encircling portion 14. Second end regions 24 and 26 of the spring wires 16 and 18 are slidable retained by spring wire guides 28 and 30 which are located on the lens encircling portion 14. Each spring wire guide 28 and 30 is in the form of an ear with a bore 32 and 34 sized larger than the diameter of the spring wires 16 and 18 to allow the end regions 24 and 26 of the spring wires 16 and 18 to slide freely therethrough. The spring wires 16 and 18 have terminating stop ends 36 and 38 which prevent the end regions 24 and 26 from sliding out of the spring wire guides 28 and 30. The spring wires 16 and 18 are preferably made of metal wires having substantial resilience and springiness, and tend to try to return to a position wherein the spring wires 16 and 18 spring outwardly and expand from the lens encircling portion 14, with the terminating stop ends 36 and 38 biased closer to the spring wire guides 38 and 30. As depicted in FIGS. 1–4, the degree of displacement of the points of attachment of the first ends 20 and 22 of the spring wires and the position of the spring wire guides 28 and 30 is about 180 degrees, but can be more or less. For angular displacements of about 180 degrees, the spring wires 16 and 18 will flare sidewardly, but not outwardly. For larger angular displacements, not only will there be sideward flaring, but also outward flaring.

Turning to FIG. 3, the eyeglass lens holder 10 of FIGS. 1 and 2 is shown positioned in the lens opening 40 of an eyeglass frame 42. A second eyeglass lens holder is shown in phantom in the other lens opening in the eyeglass frame 42.

FIGS. 4–6 are views showing how the first embodiment of the eyeglass lens holder 10 is retained in the lens opening 40 of the eyeglass frame 42. The lens openings 40 of the eyeglass frames 42 have an inner channel or groove 44 around their inner perimeter 46. Portions of the spring wires 16 and 18 will spring into portions of the inner channel or groove 44 of the eyeglass frames 42 and thus act to positively retain the eyeglass lens holder 10 in place. The terminating ends 36 and 38 can, but need not, be retained in the inner channel or groove 44 of the eyeglass frames. Referring to FIG. 5, the terminating ends 36 and 38 can comprise the wire being bent over at an angle, or can comprise an enlarged end, such as a ball 48, as shown in FIG. 6.

Figure 8:
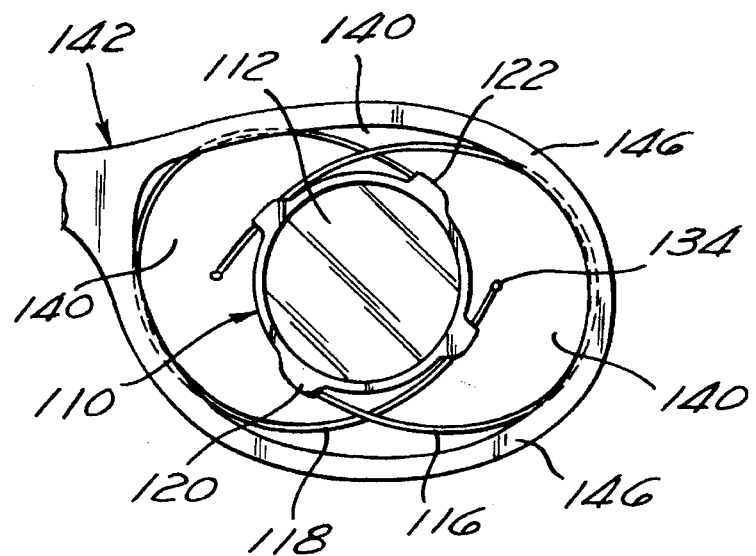
FIG. 8 is a front view of the eyeglass lens holder placed in an eyeglass frame.
Figure 9:
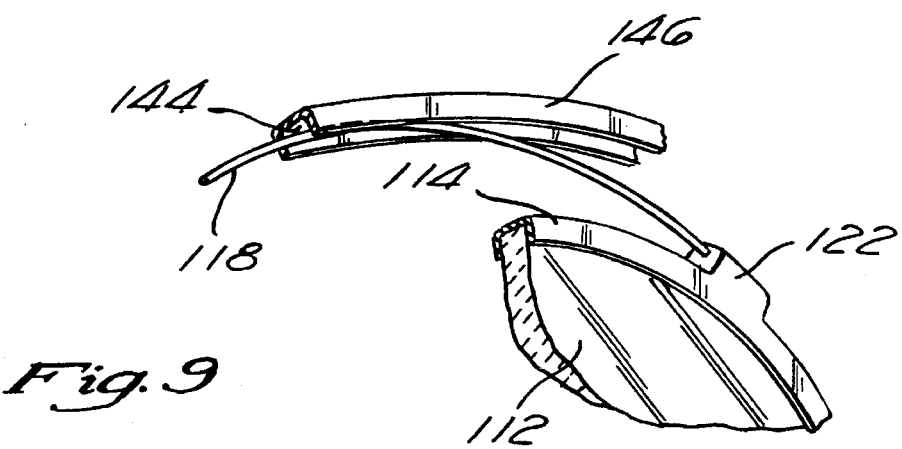
FIG. 9 is a partially exposed detail of the circled area 9 of FIG. 8 showing how the eyeglass lens holder is detachably positioned in the eyeglass frame.

Referring to FIGS. 7–9, a second embodiment of the eyeglass lens holder 100 for selection of eyeglass frames of the invention is shown. It is similar to the embodiment of the invention described above with reference to FIGS. 1–6. It has a lens 112 which is retained in a lens encircling portion 114. This lens encircling portion 114 can conveniently comprise a U-shaped metal band clamped closed around the lens 112. The lens holder 110 further has a pair of spring wires 116 and 118. The spring wires 116 and 118 are attached at first ends 120 and 122 to opposite sides of the lens encircling portion 114. End regions 124 and 126 of the spring wires 116 and 118 are slidable retained by spring wire guides 128 and 130 which are located on the lens encircling portion 114. Each spring wire guide 128 and 130 has a bore (not shown) which is sized larger than the diameter of the spring wires 116 and 118 to allow the end regions 124 and 126 of the spring wires 116 and 118 to slide freely therethrough. The spring wires 116 and 118 have terminating stop ends 132 and 134 which prevent the end regions 124 and 126 from sliding out of the spring wire guides 128 and 130. The spring wires 116 and 118 are preferably made of metal wires having substantial resilience and springiness, and tend "spring out" to a position wherein the spring wires 116 and 118 spring outwardly from the lens encircling portion 114, with the terminating stop ends 132 and 134 biased closer to the spring wire guides 128 and 130. The spring wires 116 and 118 thus positioned form opposing spring wire loops 136 and 138 which extend sidewardly and outwardly from the lens encircling portion 114, to give the lens holder 110 a longer and wider profile.

The degree of displacement of each of the spring wire guides 128 and 130 from the points of attachment 120 and 122 of the spring wires 116 and 118 on the lens encircling portion 114 is important in that it is influential in determining the degree to which the wire loops 136 and 138 extend sidewardly and outwardly. In the embodiment depicted in FIGS. 7 and 8, the angular displacement of the spring wire guides 128 and 130 from the points of attachment 120 and 122 of the spring wires 116 and 118, respectively, are about 270 degrees, but could be between 180 and 270 degrees. By increasing the angular displacement, and increasing the length of the spring wires 116 and 118, the wires loops 136 and 138 can increase in width relative to the diameter "A" of the lens encircling portion 114 to a wider size "B" when fully expanded, but which can be squeezed to a smaller size when desired. In fact, when the wire loops 136 and 138 are squeezed inwardly, not only will they extend sidewardly less, but also become narrower than the width "B".

Turning to FIGS. 8 and 9, the eyeglass lens holder 110 of FIG. 7 is shown positioned in the lens opening 40 of an eyeglass frame 142. The lens opening 140 of the eyeglass frame 142 has an internal channel or groove 144 around its inner perimeter 146. Portions of the spring wires 116 and 118 will spring into portions of the inner channel or groove 144 of the eyeglass frames 142 and thus act to positively retain the eyeglass lens holder 110 in place in the openings 140 of the eyeglass frame 142, positionable in the line of sight of the wearer's eyes.

Due to the unique design of the eyeglass lens holders 10 and 110, the eyeglass lens holders 10 and 110 can be used with any number of styles of eyeglass frames. The eyeglass lens holder 10 and 110 of the invention thus permits a patient who has an optical (visual) deficiency to easily and clearly view, without distortion, how he or she looks while actually wearing the eyeglass frames, even from a distance, even before the frame is fitted with its permanent lenses. For eyeglass wearers who have severe visual deficiencies, glasses must be worn at all times. The eyeglass lens holder 10 and 110 of the invention will thus in particular give these eyeglass wearers the clear vision necessary to make a informed choice of eyeglass style.

In general, the eyeglass lens holders 10 and 110 will adapt to the inner channel or groove of most lens frames in order that patients may view lens frames utilizing a prescription similar to their own. With proper magnification it will make it easier for the patient to determine exactly what the frame will look like on him or her.

The above description has described each of two embodiments of the eyeglass lens holders 10 and 110. In actual use, a set of pairs of eyeglass lens holders 10 and 110 are provided, for example utilizing lenses 12 or 112 ranging in power from +1.00 D (Diopter) to +8.00 D and from −1.00D to −12.00 D (in 1 D increments). Arranged as such, there will be two lenses in each power (i.e. 20 lenses for the right eye and 20 lenses for the left eye). This range of lenses allows for a reasonably close correction being placed in front of each eye individually to approximate the patient's true correction, yet does not require an inordinate number of eyeglass lens holders 10 or 110 of the invention.

The wire spring 16 and 18 or 116 and 118 of both embodiments can be movably adjusted as desired so that a substantial portion of the spring wires 16 and 18 or 116 and 118 are not exposed—that is, they are held within the inner grooves of the frame. In this way, the patient can clearly visualize the look of the frame without being unduly distracted by the spring wires 16 and 18 or 116 and 118.

Also, in lieu of using metal to form the lens encircling portions and spring wires, the whole unit, less the lens, can be formed of resilient plastic, either unitarily in a single unit, or out of several pieces, with for example the spring wires being formed separately and later attached to the lens encircling portion. A separate forming step would function well where the use of different materials, i.e. metal and plastics, is desired.

Thus, the eyeglass lens holder of the invention provides a convenient and easy to use eyeglass lens holder which is adapted to fit in a wide variety of eyeglass frames. Further, the eyeglass lens holder will not excessively detract from the appearance of the eyeglasses, so the wearer can make an informed, undistracted choice of eyeglass frames.

The drawings and the foregoing description are not intended to represent the only form of the invention in regard to the details of its construction and manner of operation. In fact, it will be evident to one skilled in the art that modifications and variations may be made without departing from the spirit and scope of the invention. Changes in form and in the proportion of parts, as well as the substitution of equivalents, are contemplated as circumstances may suggest or render expedient; and although specific terms have been employed, they are intended in a generic and descriptive sense only and not for purpose of limitation, the scope of the invention being delineated in the following claims:

I claim:

1. A lens holder system for temporarily holding a prescription lens in the opening of eyeglass frames having perimeter grooves, comprising lens holders, each having:

a prescription lens;

a prescription lens encircling portion;

a pair of resilient, spring wire means with first and second end regions, said spring wires being fixably attached by said first end regions to opposing sides of said prescription lens encircling portion; and a pair of guide means positioned on said lens encircling portion distant from the points of attachment of said first end regions of said spring wire means to said lens encircling portion;

wherein each of said second end regions of said spring wires are slidably engaged with one of said guide means and said second end regions of said spring wires have terminal stop means to prevent said second end regions from being withdrawn from said guide means, said pair of spring wire means forming a pair of spring wire loops which extend from opposite sides of the lens encircling portion, and which tend to expand outwardly, and which can be contracted and expanded as desired to temporarily retain the prescription lens in the eyeglass frame during a eyeglass frame selection process.

2. The lens holder system of claim 1, wherein said spring wire guide means comprise ears with bores sized to permit the spring wire to freely slide through the bore, with the terminal stop means being sized larger than the bores to prevent complete withdrawal of the spring wire from the guide means.

3. The lens holder system of claim 1, wherein the resilient spring wires comprise metal wires.

4. The lens holder system of claim 1, wherein said spring wire guide means and the points of attachment of said first ends of complementary spring wires are spaced apart by about 180 degrees.

5. The lens holder system of claim 1, wherein said spring wire guide means and the points of attachment of said first ends of complementary spring wires are spaced apart by over 180 degrees.

6. The lens holder system of claim 1, wherein said spring wire guide means and the points of attachment of said first ends of complementary spring wires are spaced apart by between about 180 and 270 degrees.

7. The lens holder system of claim 1, wherein said system comprises a plurality of pairs of said lens holders with lenses of different prescription correction to accommodate the needs of a variety of patients.

8. The lens holder system of claim 7, wherein said plurality of pairs of said prescription lenses range from +1.00 Diopters to +8.00 Diopters and from −1.00 Diopters to −12.00 Diopters.

9. The lens holder system of claim 8, wherein said plurality of pairs of said prescription lenses are provided in one Diopter increments.

10. A lens holder system for temporarily holding prescription lenses in the openings eyeglass frames having perimeter grooves, comprising a plurality of pairs of lens holders, each plurality of pairs of lens holders having:

a prescription lens;

a prescription lens encircling portion;

a pair of resilient, spring wire means with first and second end regions, said spring wires being fixably attached by said first end regions to opposing sides of said prescription lens encircling portion; and a pair of guide means positioned on said lens encircling portion distant from the points of attachment of said first end regions of said spring wire means to said lens encircling portion;

wherein each of said second end regions of said spring wires are slidably engaged with one of said guide means and said second end regions of said spring wires have terminal stop means to prevent said second end regions from being withdrawn from said guide means, said pair of spring wire means forming a pair of spring wire loops which extend from opposite sides of the lens encircling portion, and which tend to expand outwardly, and which can be contracted and expanded as desired to temporarily retain the prescription lens in the eyeglass frame during a eyeglass frame selection process.

11. The lens holder system of claim 10, wherein said spring wire guide means comprise ears with bores sized to permit the spring wire to freely slide through the bore, with the terminal stop means being sized larger than the bores to prevent complete withdrawal of the spring wire from the guide means.

12. The lens holder system of claim 10, wherein the resilient spring wires comprise metal wires.

13. The lens holder system of claim 10, wherein said spring wire guide means and the points of attachment of said first ends of complementary spring wires are spaced apart by about 180 degrees.

14. The lens holder system of claim 10, wherein said spring wire guide means and the points of attachment of said first ends of complementary spring wires are spaced apart by between about 180 and 270 degrees.

15. The lens holder system of claim 10, wherein said plurality of pairs of said prescription lenses range from +1.00 Diopters to +8.00 Diopters and from −1.00 Diopters to −12.00 Diopters.

16. The lens holder system of claim 15, wherein said plurality of pairs of said prescription lenses are provided in one Diopter increments.

* * * * *